US012679356B2

(12) United States Patent
Kumazaki

(10) Patent No.: US 12,679,356 B2
(45) Date of Patent: Jul. 14, 2026

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventor: Kenta Kumazaki, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 18/595,685

(22) Filed: Mar. 5, 2024

(65) Prior Publication Data

US 2025/0042395 A1 Feb. 6, 2025

(30) Foreign Application Priority Data

Mar. 7, 2023 (JP) ................................ 2023-034858

(51) Int. Cl.
*B60W 30/12* (2020.01)

(52) U.S. Cl.
CPC ......... *B60W 30/12* (2013.01); *B60W 2552/53* (2020.02)

(58) Field of Classification Search
CPC ..... B60W 2050/0096; B60W 60/0053; B60W 30/12; G06V 20/588; B62D 15/025
See application file for complete search history.

(56) References Cited

U.S. PATENT DOCUMENTS

| 2015/0006028 A1* | 1/2015 | Strauss | ............... B60W 50/082 |
| | | | 701/36 |
| 2020/0130727 A1* | 4/2020 | Kim | ..................... B62D 15/025 |
| 2022/0118973 A1* | 4/2022 | Craigen | ............... B60W 30/12 |

FOREIGN PATENT DOCUMENTS

| EP | 2143612 A1 * | 1/2010 | ............ B60W 50/08 |
| JP | 2012-218592 A | 11/2012 | |
| JP | 2014144745 A * | 8/2014 | |
| JP | 2015-115040 A | 6/2015 | |

* cited by examiner

*Primary Examiner* — Grant Moubry
*Assistant Examiner* — Joshua Campbell
(74) *Attorney, Agent, or Firm* — Dinsmore & Shohl LLP

(57) ABSTRACT

A vehicle controller includes a processor configured to detect a lane line defining a lane being traveled by a vehicle, calculate a departure index indicating the possibility of the vehicle departing from the lane, based on the positional relationship between the lane line and the vehicle, determine whether a predetermined departure condition is satisfied, based on the departure index, execute departure prevention control of the vehicle to prevent the vehicle departing from the lane, when the departure condition is satisfied, and relax the predetermined departure condition and reduce the amount of control of the vehicle upon execution of the departure prevention control, depending on operation to prevent the vehicle departing from the lane performed by a driver of the vehicle before the departure condition is satisfied.

6 Claims, 5 Drawing Sheets

VEHICLE CONTROLLER, METHOD, AND COMPUTER PROGRAM FOR VEHICLE CONTROL

CROSS-REFERENCE TO RELATED APPLICATIONS

This application claims priority to Japanese Patent Application No. 2023-034858 filed Mar. 7, 2023, the entire contents of which are herein incorporated by reference.

FIELD

The present disclosure relates to a vehicle controller, a method, and a computer program for vehicle control.

BACKGROUND

Research has been carried out to develop a technique for automatically preventing a vehicle departing from its own lane, i.e., lane departure prevention (LDP) (see Japanese Unexamined Patent Publication JP2014-144745A).

A travel control unit described in JP2014-144745A determines an index of the possibility of a vehicle departing from a travel path, and causes the vehicle to make a corrective motion when the index exceeds a threshold, thereby controlling travel to reduce the possibility of departure. The travel control unit makes the amount of control of a corrective motion of the vehicle greater when the driver operates steering in a direction such that the possibility of departure is reduced than when the driver does not operate steering in that direction. In addition, the travel control unit reduces the threshold of the index to increase the amount of control of a corrective motion.

SUMMARY

In the above-described technique, as the driver operates steering more in order to reduce the possibility of lane departure, the amount of control of a corrective motion of the vehicle increases, and thus the amount of change in motion for the vehicle to continue traveling in its own lane, in particular, the amount of change in orientation of the vehicle, will also increase. Thus, in some cases, the orientation of the vehicle may vary too much upon execution of control of lane departure prevention, resulting in the driver feeling uneasy.

It is an object of the present disclosure to provide a vehicle controller that can prevent departure of a vehicle from its own lane without causing unease on the part of a driver of the vehicle.

According to an embodiment, a vehicle controller is provided, which includes a processor configured to: detect a lane line defining a lane being traveled by a vehicle, calculate a departure index indicating the possibility of the vehicle departing from the lane, based on the positional relationship between the lane line and the vehicle, determine whether a predetermined departure condition is satisfied, based on the departure index, execute departure prevention control of the vehicle to prevent the vehicle departing from the lane, when the departure condition is satisfied, and relax the predetermined departure condition and reduces the amount of control of the vehicle upon execution of departure prevention control, depending on an operation performed by the driver of the vehicle in order to prevent the vehicle departing from the lane before the departure condition is satisfied.

The processor of the vehicle controller tightens the departure condition and increases the amount of control of the vehicle upon execution of departure prevention control, depending on an operation performed by the driver to interrupt departure prevention control during execution of departure prevention control.

Every time an operation to prevent the vehicle departing from the lane is performed, the processor increases, by a predetermined increment, a departure prevention count indicating the number of times the operation has been performed; and when the value of the departure prevention count exceeds a predetermined number, the processor relaxes the predetermined departure condition and reduces the amount of control of the vehicle upon execution of departure prevention control.

In this case, the processor modifies the predetermined increment, depending on the situation of the vehicle where operation to prevent the vehicle departing from the lane is performed.

According to another embodiment, a method for vehicle control is provided. The method includes detecting a lane line defining a lane being traveled by a vehicle; calculating a departure index indicating the possibility of the vehicle departing from the lane, based on the positional relationship between the lane line and the vehicle; determining whether a predetermined departure condition is satisfied, based on the departure index; executing departure prevention control of the vehicle to prevent the vehicle departing from the lane, when the departure condition is satisfied; and relaxing the predetermined departure condition and reducing the amount of control of the vehicle upon execution of departure prevention control, depending on an operation performed by a driver of the vehicle to prevent the vehicle departing from the lane before the departure condition is satisfied.

According to still another embodiment, a non-transitory recording medium that stores a computer program for vehicle control is provided. The computer program causes a processor mounted on a vehicle to execute a process including detecting a lane line defining a lane being traveled by the vehicle; calculating a departure index indicating the possibility of the vehicle departing from the lane, based on the positional relationship between the lane line and the vehicle; determining whether a predetermined departure condition is satisfied, based on the departure index; executing departure prevention control of the vehicle to prevent the vehicle departing from the lane, when the departure condition is satisfied; and relaxing the predetermined departure condition and reducing the amount of control of the vehicle upon execution of departure prevention control, depending on operation performed by a driver of the vehicle to prevent the vehicle departing from the lane before the departure condition is satisfied.

The vehicle controller according to the present disclosure has an effect of being able to prevent departure of a vehicle from its own lane without causing a driver of the vehicle to feel uneasy.

BRIEF DESCRIPTION OF DRAWINGS

FIG. 3 is a functional block diagram of a processor of the electronic control unit, related to a vehicle control process.

DESCRIPTION OF EMBODIMENTS

A vehicle controller, a method for vehicle control executed by the vehicle controller, and a computer program for vehicle control will now be described with reference to the attached drawings. The vehicle controller determines whether a predetermined departure condition is satisfied, based on a departure index indicating the possibility of a vehicle departing from its own lane. When the predetermined departure condition is satisfied, the vehicle controller executes departure prevention control of the vehicle to prevent the vehicle departing from the lane. In addition, the vehicle controller relaxes the predetermined departure condition and reduces the amount of control of the vehicle upon execution of departure prevention control, depending on an operation performed by a driver of the vehicle to prevent the vehicle departing from the lane before the departure condition is satisfied.

Figure 1:
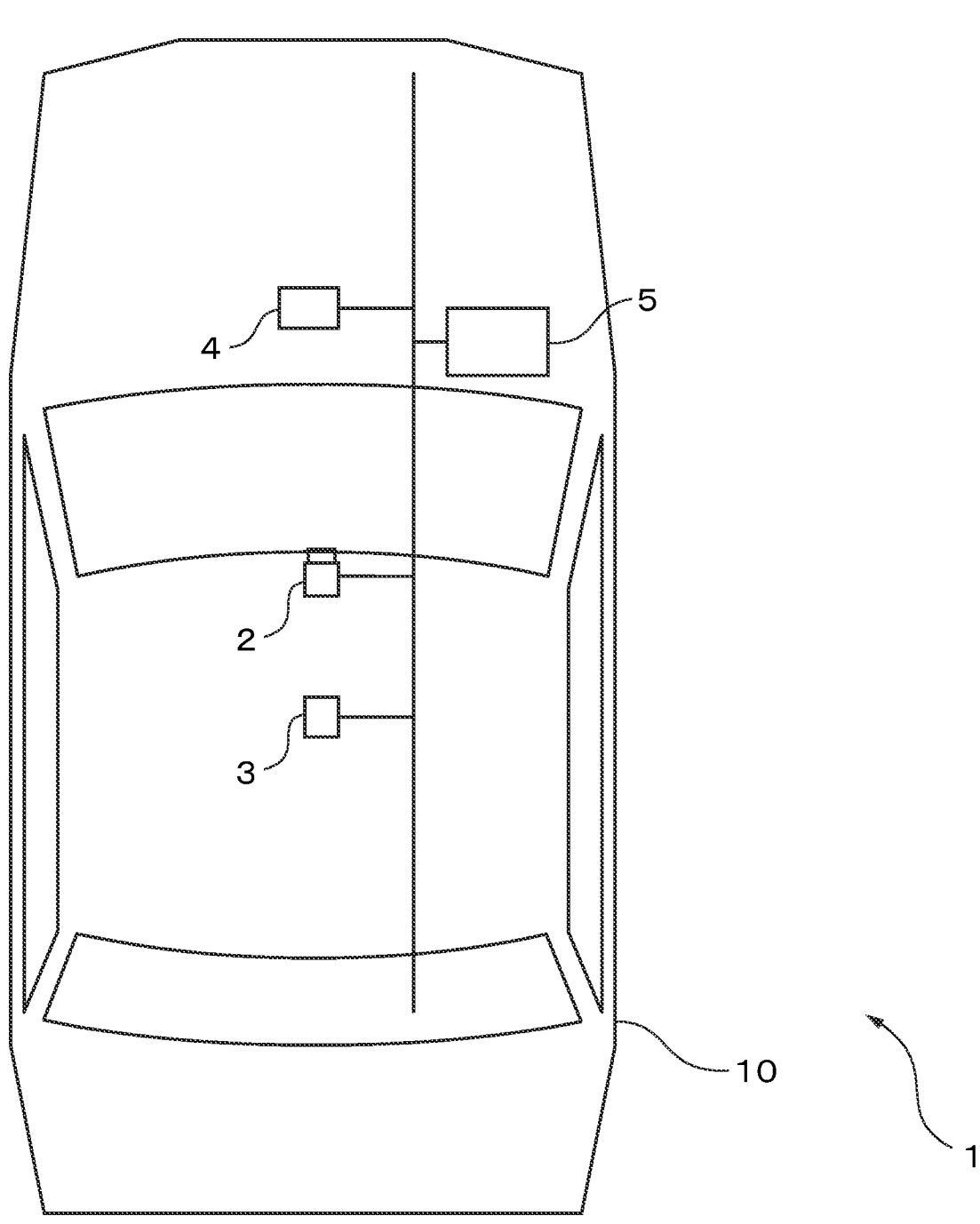
FIG. 1 schematically illustrates the configuration of a vehicle control system equipped with a vehicle controller.
Figure 2:
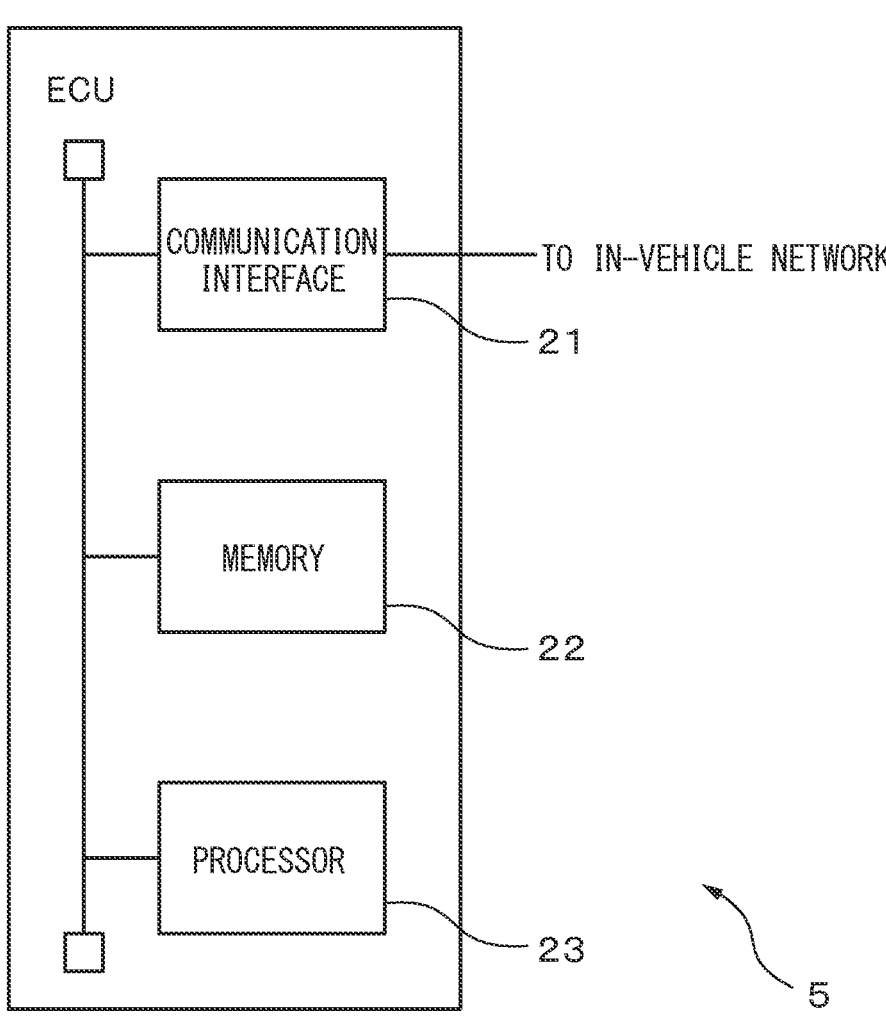
FIG. 2 illustrates the hardware configuration of an electronic control unit, which is an embodiment of the vehicle controller.

FIG. 1 schematically illustrates the configuration of a vehicle control system equipped with a vehicle controller. FIG. 2 illustrates the hardware configuration of an electronic control unit, which is an embodiment of the vehicle controller. The vehicle control system 1 is mounted on a vehicle 10, which is an example of a host vehicle, and can execute autonomous driving control of the vehicle 10. To achieve this, the vehicle control system 1 includes a camera 2, a GPS receiver 3, a storage device 4, and an electronic control unit (ECU) 5, which is an example of the vehicle controller. The camera 2, the GPS receiver 3, and the storage device 4 are communicably connected to the ECU 5 via an in-vehicle network conforming to a standard such as a controller area network. The vehicle control system 1 may further include a range sensor (not illustrated), such as a LiDAR sensor or radar. The vehicle control system 1 may further include a wireless communication terminal (not illustrated) for wireless communication with another device.

The camera 2 is an example of a sensor that can sense an object in the vicinity of the vehicle 10. The camera 2 includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 takes pictures of a region in front of the vehicle 10 every predetermined capturing period, and generates images representing this region. Each image obtained by the camera 2 is an example of a sensor signal, and may be a color or grayscale image. The vehicle 10 may include two or more cameras taking pictures in different orientations or having different focal lengths.

Every time an image is generated, the camera 2 outputs the generated image to the ECU 5 via the in-vehicle network.

The GPS receiver 3, which is an example of a position determining device, receives GPS signals from GPS satellites at predetermined intervals, and determines the position of the vehicle 10, based on the received GPS signals. The GPS receiver 3 outputs positioning information indicating the result of determination of the position of the vehicle 10, based on the GPS signals to the ECU 5 via the in-vehicle network at predetermined intervals. Instead of the GPS receiver 3, the vehicle 10 may include a receiver conforming to another satellite positioning system. In this case, this receiver determines the position of the vehicle 10.

The storage device 4, which is an example of a storage unit, includes, for example, a hard disk drive, a nonvolatile semiconductor memory, or an optical medium and an access device therefor. The storage device 4 stores a high-precision map, which is an example of map information. The high-precision map includes information used for autonomous driving control about individual road sections in the region represented in the high-precision map. The information used for autonomous driving control includes, for example, information indicating road markings, such as lane lines or stop lines, and signposts of each road section, as well as information indicating features around each road section.

The storage device 4 may further include a processor for executing, for example, a process to update the high-precision map and a process related to a request from the ECU 5 to read out the high-precision map. In this case, for example, every time the vehicle 10 moves a predetermined distance, the storage device 4 transmits a request to obtain a high-precision map, together with the current position of the vehicle 10, to a map server via a wireless communication terminal (not illustrated). Then the storage device 4 receives map information including a high-precision map of a predetermined region around the current position of the vehicle 10 from the map server via the wireless communication terminal, and stores the high-precision map. When receiving a request from the ECU 5 to read out the high-precision map, the storage device 4 cuts out that portion of the high-precision map stored therein which includes the current position of the vehicle 10 and which represents a region smaller than the predetermined region, and outputs the cutout portion to the ECU 5 via the in-vehicle network.

The ECU 5 executes a process for assisting the driver in driving the vehicle 10. In the present embodiment, when the vehicle 10 is about to depart from its own lane, the ECU 5 executes departure prevention control for preventing the vehicle from departing.

As illustrated in FIG. 2, the ECU 5 includes a communication interface 21, a memory 22, and a processor 23. The communication interface 21, the memory 22 and the processor 23 may be configured as separate circuits or a single integrated circuit.

The communication interface 21 includes an interface circuit for connecting the ECU 5 to the in-vehicle network. Every time an image is received from the camera 2, the communication interface 21 passes the received image to the processor 23. Every time positioning information is received from the GPS receiver 3, the communication interface 21 passes the positioning information to the processor 23. In addition, the communication interface 21 passes the high-precision map read from the storage device 4 to the processor 23.

The memory 22, which is another example of a storage unit, includes, for example, volatile and nonvolatile semiconductor memories, and stores various types of data used in a vehicle control process executed by the processor 23 of the ECU 5. For example, the memory 22 stores a departure condition for determining whether to execute departure prevention control, and various types of information used for calculating a departure index, such as a set of parameters specifying a classifier for detecting a lane line. In addition, the memory 22 stores parameters of the camera 2, such as the focal length, the orientation, and the mounted position (including the height of the mounted position) of the camera 2, and a high-precision map read from the storage device 4. Further, the memory 22 temporarily stores images received from the camera 2, positioning information received from the GPS receiver 3, and various types of data generated during the vehicle control process. Such data includes a departure prevention count indicating the number of times of operation to prevent departure performed by the driver before execution of departure prevention control, and an interruption count indicating the number of times of operation to interrupt departure prevention control performed during execution of departure prevention control.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
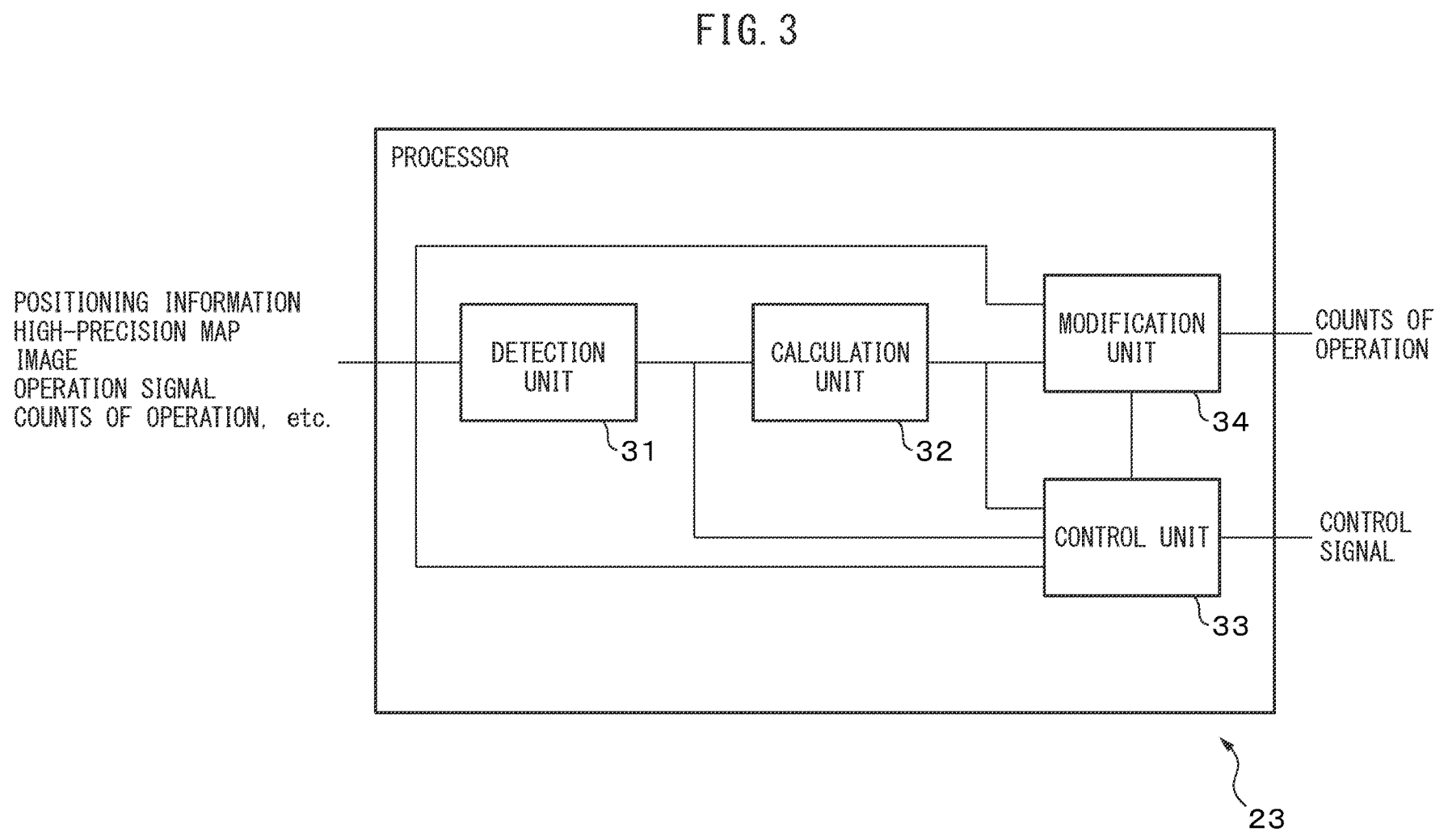

FIG. 3 is a functional block diagram of the processor 23, related to the vehicle control process. The processor 23 includes a detection unit 31, a calculation unit 32, a control unit 33, and a modification unit 34. These units included in the processor 23 are functional modules, for example, implemented by a computer program executed by the processor 23, or may be dedicated operating circuits provided in the processor 23.

The detection unit 31 detects a lane line defining a lane being traveled by the vehicle 10 from an image generated by the camera 2. Specifically, the detection unit 31 inputs an image obtained from the camera 2 into a classifier to detect a lane line. As such a classifier, the detection unit 31 can use a deep neural network (DNN) for object detection having architecture of a convolutional neural network (CNN) type, such as, Single Shot MultiBox Detector (SSD) or Faster R-CNN. Alternatively, as such a classifier, the detection unit 31 may use a DNN having architecture of a self-attention network (SAN) type, a DNN for semantic segmentation, such as Fully Convolutional Network or U-net, or a classifier based on another machine learning technique, such as an AdaBoost classifier. Such a classifier is trained in advance in accordance with a predetermined training technique, such as backpropagation, using a large number of training images representing lane lines, so as to detect a lane line from an image or to distinguish individual pixels representing a lane line from other pixels. The classifier outputs information indicating a region representing a lane line detected in an inputted image.

The detection unit 31 notifies the calculation unit 32 and the control unit 33 of the information indicating a region representing a lane line in the image.

The calculation unit 32 calculates a departure index indicating the possibility of the vehicle 10 departing from the lane, based on the positional relationship between the lane line and the vehicle 10. In the present embodiment, the calculation unit 32 calculates the distances between the vehicle 10 and the left and right lane lines defining the lane (hereafter the "lateral distances") as departure indices.

The positions in an image correspond one-to-one to directions viewed from the camera 2. Thus, based on reference positions in the horizontal direction of pixels representing the left and right lane lines near the bottom of the image as well as parameters of the camera 2, such as the focal length, the orientation, and the height of the mounted position, the calculation unit 32 estimates those positions of the left and right lane lines relative to the camera 2 which correspond to the reference positions in the image. The calculation unit 32 further calculates the distances from the camera 2 to the left and right lane lines, based on the result of this estimation, the lengthwise direction of the lane lines, and the orientation of the camera 2. For each of the left and right sides of the vehicle 10, the calculation unit 32 then calculates the lateral distance by subtracting the distance from the mounted position of the camera 2 to the side surface of the vehicle 10 from the distance from the camera 2 to the lane line.

The calculation unit 32 notifies the control unit 33 and the modification unit 34 of the lateral distances on the left and right of the vehicle 10 calculated as departure indices.

The control unit 33 determines whether a predetermined departure condition is satisfied, based on the departure index, and executes departure prevention control when the predetermined departure condition is satisfied. For example, the predetermined departure condition is that one of the left and right lateral distances, which are departure indices, falls below a first distance threshold (e.g., 5 cm), and that a trajectory of the vehicle 10 predicted thereafter crosses the lane line defining the lane. In the following, time when one of the left and right lateral distances falls below the first distance threshold will be refers to as "caution time." Every time the left and right lateral distances are received from the calculation unit 32, the control unit 33 compares these lateral distances with the first distance threshold, and detects time when the left or right lateral distance falls below the first distance threshold as caution time. After the caution time, the control unit 33 predicts the change in the lateral distance over a predetermined future period thereafter, based on the change in the lateral distance over a latest certain period until the current time. To this end, the control unit 33 applies, for example, a prediction filter, such as a Kalman filter, to the change in the lateral distance over the latest certain period to predict the change in the lateral distance over the predetermined future period. Alternatively, the control unit 33 may apply a predetermined extrapolation process to the change in the lateral distance over the latest certain period to predict the change in the lateral distance over the predetermined future period. In the case where the predicted value of the lateral distance at a certain time in the predetermined period is reduced to zero, the control unit 33 determines that the predicted trajectory of the vehicle 10 crosses the lane line defining the lane. In other words, the control unit 33 determines that the predetermined departure condition is satisfied.

Alternatively, after the caution time, the control unit 33 may determine the trajectory of the vehicle 10 within a latest certain period, based on the positions of the vehicle 10 at respective times in the certain period. Based on this trajectory, the control unit 33 may predict a trajectory of the vehicle 10 within a predetermined future period. The control unit 33 may further compare the trajectory of the vehicle 10 within the predetermined future period with the lane line defining the lane represented in the high-precision map to determine whether the predicted trajectory of the vehicle 10 crosses the lane line defining the lane. In this way, the control unit 33 can determine whether the vehicle 10 may depart from the lane, more accurately.

In this case, the control unit 33 compares an image representing the surroundings of the vehicle 10 generated by the camera 2 with the high-precision map to detect the position of the vehicle 10 at the time of generation of this image. For example, assuming the position and orientation of the vehicle 10, the control unit 33 projects features on or around the road detected from an image onto the high-precision map or features on or around the road in the vicinity of the vehicle 10 represented in the high-precision map onto the image. The features on or around the road may be, for example, road markings such as lane lines or stop lines, or curbstones. The classifier used for detecting a lane line may be trained in advance to detect these features, too. Thus the control unit 33 can also detect these features by inputting an image into the classifier. The control unit 33 estimates the position of the vehicle 10 to be the position and orientation of the vehicle 10 for the case where the features detected from the image match those represented in the high-precision map the best.

The control unit 33 uses initial values of the assumed position and orientation of the vehicle 10 and parameters of the camera 2, such as the focal length, the height of the mounted position, and the orientation, to determine the positions in the high-precision map or the image to which the features are projected. As the initial values of the position and orientation of the vehicle 10 is used the position of the vehicle 10 determined by the GPS receiver 3 at the time closest to the time of generation of the image or the position obtained by correcting, with odometry information, the position and orientation of the vehicle 10 detected last time. The control unit 33 then calculates the degree of matching between the features on or around the road detected from the image and corresponding features represented in the high-precision map (e.g., the inverse of the sum of squares of the distances between corresponding features).

The control unit 33 repeats the above-described processing while varying the assumed position and orientation of the vehicle 10, and estimates the assumed position and orientation for the case where the degree of matching is a maximum, as the actual position of the vehicle 10.

The control unit 33 determines the trajectory of the vehicle 10 within the latest certain period, by detecting the positions of the vehicle 10 at respective times of generation of images in the certain period as described above. In addition, the control unit 33 applies a prediction filter, such as a Kalman filter, or a predetermined extrapolation process to the trajectory of the vehicle 10 within the latest certain period to predict a trajectory of the vehicle 10 within the predetermined future period.

When executing autonomous driving control of the vehicle 10, the ECU 5 may request the driver to take over driving of the vehicle 10 at the caution time via a notification device (not illustrated) provided in the vehicle interior.

When the left and right lateral distances exceed a predetermined offset distance added to the first distance threshold after the caution time, the control unit 33 may determine that the departure condition is not satisfied.

According to another modified example, the control unit 33 may determine that the predetermined departure condition is satisfied, when the left or right lateral distance has not been greater than the first distance threshold for more than a predetermined time period.

When the departure condition is satisfied, the control unit 33 executes departure prevention control. As departure prevention control, the control unit 33 corrects the current steering angle by a predetermined amount of steering in a direction such that the vehicle 10 heads for the center of the lane. The control unit 33 controls the steering according to the corrected steering angle to prevent the vehicle 10 departing from the lane. The predetermined amount of steering is an example of the amount of control of the vehicle 10. In departure prevention control, the control unit 33 may execute control to decelerate the vehicle 10, together with correction of the steering angle. In this case, the control unit 33 sets the amount of braking to decelerate the vehicle 10 at a predetermined deceleration, and controls the brake according to the set amount of braking. The amount of braking is another example of the amount of control of the vehicle 10.

As will be described in detail below, the predetermined amount of steering is adjusted based on operation of the steering performed by the driver at or immediately before execution of departure prevention control. This inhibits execution of departure prevention control from making the driver uneasy.

When the left and right lateral distances exceed the predetermined offset distance added to the first distance threshold after the start of departure prevention control, the control unit 33 terminates departure prevention control.

The modification unit 34 relaxes the predetermined departure condition and further reduces the amount of control of the vehicle 10 upon execution of departure prevention control, depending on operation to prevent the vehicle 10 departing from the lane (hereafter "departure prevention operation") performed by the driver before the departure condition is satisfied.

For example, the modification unit 34 determines that the driver has performed departure prevention operation, when the steering wheel is turned so that the vehicle 10 returns to the center of the lane, in the case where the left or right lateral distance is not greater than a second distance threshold and where the departure condition is not satisfied yet. The modification unit 34 then increments the departure prevention count stored in the memory 22 by one. The second distance threshold is set to a value greater than the first distance threshold, e.g., to 10 cm. For example, in the case where the left lateral distance falls below the second distance threshold, when the steering wheel is turned so that the left lateral distance increases, i.e., rightward, the modification unit 34 determines that the steering wheel is turned so that the vehicle 10 returns to the center of the lane. In this case, the modification unit 34 determines whether the steering wheel is turned so that the vehicle 10 returns to the center of the lane, based on a steering angle received from a controller of the steering or the change in the left lateral distance. Similarly, in the case where the right lateral distance falls below the second distance threshold, when the steering wheel is turned so that the right lateral distance increases, i.e., leftward, the modification unit 34 determines that the steering wheel is turned so that the vehicle 10 returns to the center of the lane.

The modification unit 34 determines whether to modify the departure condition and the amount of control, by referring to the departure prevention count stored in the memory 22.

For example, when the departure prevention count exceeds a predetermined number, the modification unit 34 modifies the departure condition so as to relax the departure condition, and reduces the amount of departure prevention control. In this case, for example, the modification unit 34 increases the first distance threshold by a predetermined distance, and reduces the predetermined amount of steering, which is the amount of departure prevention control, by a predetermined angle. Since this results in the departure condition being more easily satisfied, execution of departure prevention control will start at earlier timing. Further, since the earlier start of departure prevention control results in the vehicle 10 taking more time to depart from the lane, a smaller amount of control will prevent the vehicle 10 departing from the lane.

In addition, the modification unit 34 may tighten the predetermined departure condition and increase the amount of control of the vehicle upon execution of departure prevention control, depending on operation to interrupt departure prevention control (hereafter "interruption operation") performed by the driver during execution of departure prevention control.

For example, the modification unit 34 determines that the driver has performed interruption operation, when the driver turns the steering wheel opposite to the direction of correction of the steering angle during execution of departure prevention control. In this case also, the modification unit 34 determines whether interruption operation has been performed, based on a steering angle received from the controller of the steering. When the driver's interruption operation is detected, the modification unit 34 increments the interruption count stored in the memory 22 by one.

The modification unit 34 determines whether to modify the departure condition and the amount of control, by referring to the interruption count stored in the memory 22.

For example, when the interruption count exceeds a predetermined number, the modification unit 34 modifies the departure condition so as to tighten the departure condition, and increases the amount of departure prevention control. In this case, for example, the modification unit 34 reduces the first distance threshold by a predetermined distance, and increases the predetermined amount of steering, which is the amount of departure prevention control, by a predetermined angle. Since this results in the departure condition being less easily satisfied, execution of departure prevention control will start at later timing. Further, since the later start of departure prevention control leads to an increase in the amount of control, the vehicle 10 will be prevented departing from the lane even if the departure condition is modified to a stricter one.

After the departure prevention count exceeds the predetermined number, the modification unit 34 may further relax the departure condition and further reduce the amount of departure prevention control every time the value of the departure prevention count increases by a predetermined additional number (e.g., one to several). More specifically, every time the value of the departure prevention count increases by the predetermined additional number, the modification unit 34 increases the first distance threshold by the predetermined distance and reduces the amount of steering by the predetermined angle. However, the modification unit 34 does not modify the first distance threshold so as to exceed a preset upper limit. This prevents departure prevention control being executed too easily. In addition, the modification unit 34 does not reduce the amount of steering of departure prevention control to below a predetermined lower limit. This prevents departure prevention control being substantially no longer executed.

Similarly, after the interruption count exceeds the predetermined number, the modification unit 34 may further tighten the departure condition and further increase the amount of departure prevention control every time the value of the interruption count increases by a predetermined additional number. More specifically, every time the value of the interruption count increases by the predetermined additional number, the modification unit 34 reduces the first distance threshold by the predetermined distance and increases the amount of steering by the predetermined angle. However, the modification unit 34 does not modify the first distance threshold to below a preset lower limit. This prevents departure prevention control being no longer executed. In addition, the modification unit 34 does not increase the amount of steering of departure prevention control to above a predetermined upper limit. This prevents the vehicle 10 rapidly changing its orientation upon execution of departure prevention control.

Figure 4:
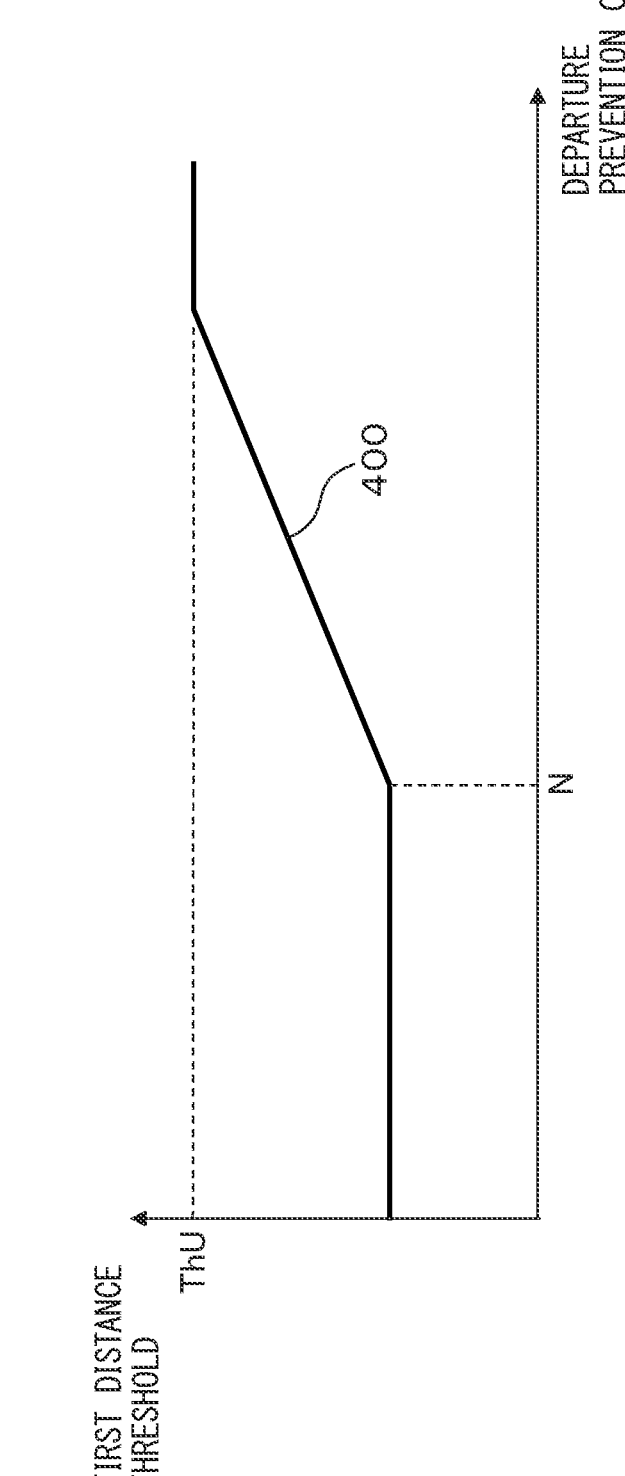
FIG. 4 illustrates the relationship between a departure prevention count and a first distance threshold, which is a departure condition.

FIG. 4 illustrates the relationship between the departure prevention count and the first distance threshold, which is a departure condition. In FIG. 4, the abscissa represents the value of the departure prevention count, and the ordinate the first distance threshold. A graph 400 represents the relationship between the value of the departure prevention count and the first distance threshold.

As illustrated by the graph 400, the first distance threshold is kept constant until the value of the departure prevention count exceeds a predetermined number N. Thereafter, every time the value of the departure prevention count increases, the first distance threshold also increases. Along with this, the amount of departure prevention control (e.g., the amount of steering) gradually decreases. After the first distance threshold reaches its upper limit ThU, the first distance threshold is kept constant even when the value of the departure prevention count increases.

Figure 5:
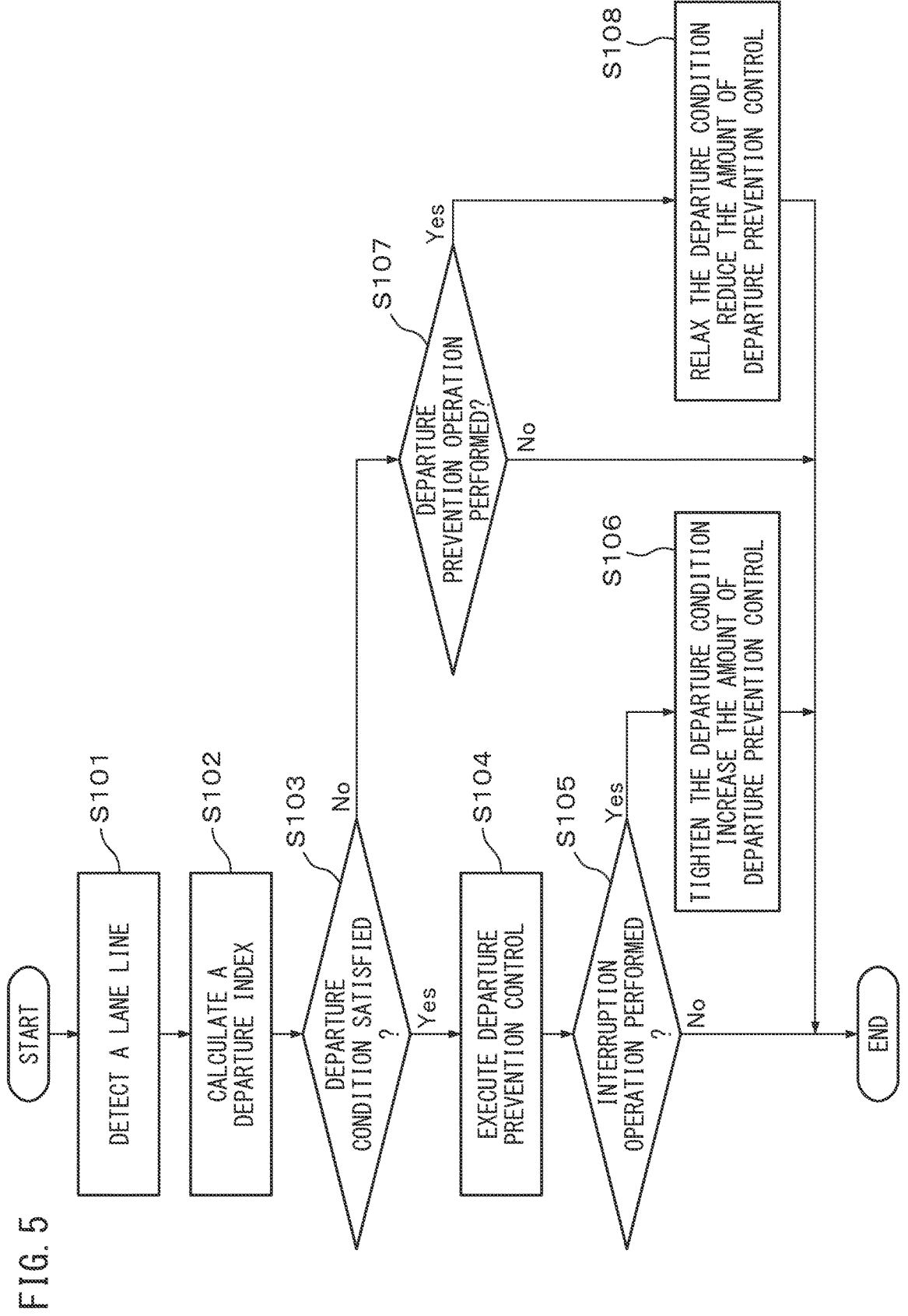
FIG. 5 is an operation flowchart of the vehicle control process according to the embodiment.

FIG. 5 is an operation flowchart of the vehicle control process. The processor 23 executes the vehicle control process in accordance with the operation flowchart described below.

The detection unit 31 of the processor 23 detects a lane line defining a lane being traveled by the vehicle from an image generated by the camera 2 (step S101). The calculation unit 32 of the processor 23 calculates a departure index, based on the positional relationship between the detected lane line and the vehicle 10 (step S102). In addition, the control unit 33 of the processor 23 determines whether a departure condition is satisfied, based on the departure index (step S103).

When the departure condition is satisfied (Yes in step S103), the control unit 33 executes departure prevention control (step S104). The modification unit 34 of the processor 23 determines whether the driver has performed interruption operation to interrupt departure prevention control during execution of departure prevention control (step S105). When the driver has not performed interruption operation (No in step S105), the processor 23 terminates the vehicle control process. When the driver has performed interruption operation (Yes in step S105), the modification unit 34 modifies the departure condition so as to tighten the departure condition and increases the amount of control of the vehicle 10 upon execution of departure prevention control (step S106). The processor 23 then terminates the vehicle control process.

When the departure condition is not satisfied in step S103 (No in step S103), the modification unit 34 determines whether the driver has performed departure prevention operation to prevent the vehicle 10 departing from the lane before the departure condition is satisfied (step S107). When the driver has not performed departure prevention operation (No in step S107), the processor 23 terminates the vehicle control process. When the driver has performed departure prevention operation (Yes in step S107), the modification unit 34 modifies the departure condition so as to relax the departure condition and reduces the amount of control of the vehicle 10 upon execution of departure prevention control (step S108). The processor 23 then terminates the vehicle control process.

As has been described above, the vehicle controller executes departure prevention control to prevent the vehicle departing from its own lane, when a predetermined departure condition is satisfied. The vehicle controller relaxes the departure condition and reduces the amount of control of the vehicle during execution of departure prevention control, depending on operation to prevent departure of the vehicle performed by the driver before the departure condition is satisfied. The vehicle controller adjusts the departure condition in this way, depending on the driver's operation, and thus can match start timing of departure prevention control to the driver's sensibilities. When the departure condition is relaxed and departure prevention control is easily executed, the vehicle controller reduces the amount of departure prevention control, and thus can inhibit abrupt motion of the vehicle during departure prevention control. This enables the vehicle controller to inhibit the driver from feeling uneasy. Further, the vehicle controller tightens the departure condition and increases the amount of control of the vehicle during execution of departure prevention control, depending on interruption operation performed by the driver during execution of departure prevention control. In this way, when the departure condition is tightened and departure prevention control is less easily executed, the vehicle controller increases the amount of departure prevention control, and thus can reliably prevent the vehicle departing from the lane even if departure prevention control starts late.

According to a modified example, the modification unit 34 may modify the increment of the departure prevention count or the interruption count, depending on the situation of the vehicle 10. For example, the increment of the departure prevention count may decrease with the radius of curvature of the road being traveled by the vehicle 10 when departure prevention operation is performed by the driver. Similarly, the increment of the interruption count may decrease with the radius of curvature of the road being traveled by the vehicle 10 when interruption operation is performed by the driver. In this case, the modification unit 34 identifies the radius of curvature of the road being traveled by the vehicle 10, by referring to the result of the latest detection of the position of the vehicle 10 and the high-precision map.

In a situation where a lane line is difficult to detect, such as rainy, snowy, or foggy weather, the departure index may be inaccurate. Thus the modification unit 34 may set the increment of the departure prevention count or the interruption count to a value smaller than usual (e.g., 0 to 0.5), when the vehicle 10 is in a situation where a lane line is difficult to detect at the time of the driver's departure prevention operation or interruption operation. The modification unit 34 determines that the vehicle 10 is in a situation where a lane line is difficult to detect, when the value of rainfall measured by a rainfall sensor mounted on the vehicle 10 is not less than a predetermined rainfall threshold. Alternatively, the modification unit 34 may determine that the vehicle 10 is in a situation where a lane line is difficult to detect, when a signal indicating that the windshield wipers of the vehicle 10 are operating is received by the ECU 5 from the windshield wipers or when a fog lamp is lighting up.

According to this modified example, the effect of the driver's operation contrary to his/her own preferences due to the situation of the vehicle 10 is reduced. Thus the modification unit 34 can inhibit the start timing of execution of departure prevention control from deviating from timing that matches the driver's preferences.

The computer program for achieving the functions of the processor 23 of the ECU 5 according to one of the embodiments and modified examples may be provided in a form recorded on a computer-readable portable storage medium, such as a semiconductor memory, a magnetic medium, or an optical medium.

What is claimed is:

1. A vehicle controller comprising:
a processor configured to:
   detect a lane line defining a lane being traveled by a vehicle,

12 calculate a departure index indicating a possibility of the vehicle departing from the lane, based on a positional relationship between the lane line and the vehicle, determine whether a predetermined departure condition is satisfied, based on the departure index, upon determination that the departure condition is not satisfied, determine whether a driver of the vehicle has performed a departure prevention operation to prevent the vehicle from departing from the lane before the departure condition is satisfied, upon determination that the driver has performed the departure prevention operation, modify the departure so as to relax the departure condition and reduce the amount of control of the vehicle upon execution of the departure prevention control, upon determination that the departure condition is satisfied:
   execute departure prevention control of the vehicle to prevent the vehicle departing from the lane, when the predetermined departure condition is satisfied, determine whether the driver has performed an interruption operation to interrupt the departure prevention control during execution of the departure prevention control, and upon determination that the driver has performed the interruption operation, modify the departure condition so as to tighten the departure condition and increase the amount of control of the vehicle upon execution of the departure prevention control.

2. The vehicle controller according to claim 1, wherein the processor tightens the predetermined departure condition and increases the amount of control of the vehicle upon execution of the departure prevention control, depending on an operation to interrupt the departure prevention control performed by the driver during execution of the departure prevention control.

3. The vehicle controller according to claim 1, wherein every time the operation to prevent the vehicle departing from the lane is performed, the processor increases, by a predetermined increment, a departure prevention count indicating the number of times the operation has been performed; and when a value of the departure prevention count exceeds a predetermined number, the processor relaxes the predetermined departure condition and reduces the amount of control of the vehicle upon execution of the departure prevention control.

4. The vehicle controller according to claim 3, wherein the processor modifies the predetermined increment, depending on the situation of the vehicle where the operation to prevent the vehicle departing from the lane is performed.

5. A method for vehicle control, comprising:
detecting a lane line defining a lane being traveled by a vehicle;

calculating a departure index indicating a possibility of the vehicle departing from the lane, based on a positional relationship between the lane line and the vehicle;

determining whether a predetermined departure condition is satisfied, based on the departure index;

upon determination that the departure condition is not satisfied, determining whether a driver of the vehicle has performed a departure prevention operation to prevent the vehicle from departing from the lane before the departure condition is satisfied;

upon determination that the driver has performed the departure prevention operation, modifying the departure so as to relax the departure condition and reduce the amount of control of the vehicle upon execution of the departure prevention control;

upon determination that the departure condition is satisfied:

executing departure prevention control of the vehicle to prevent the vehicle departing from the lane, when the predetermined departure condition is satisfied;

determining whether the driver has performed an interruption operation to interrupt the departure prevention control during execution of the departure prevention control; and upon determination that the driver has performed the interruption operation, modifying the departure condition so as to tighten the departure condition and increase the amount of control of the vehicle upon execution of the departure prevention control.

6. A non-transitory recording medium that stores a computer program for vehicle control, the computer program causing a processor mounted on a vehicle to execute a process comprising:

detecting a lane line defining a lane being traveled by the vehicle;

calculating a departure index indicating a possibility of the vehicle departing from the lane, based on a positional relationship between the lane line and the vehicle;

determining whether a predetermined departure condition is satisfied, based on the departure index;

upon determination that the departure condition is not satisfied, determining whether a driver of the vehicle has performed a departure prevention operation to prevent the vehicle from departing from the lane before the departure condition is satisfied;

upon determination that the driver has performed the departure prevention operation, modifying the departure so as to relax the departure condition and reduce the amount of control of the vehicle upon execution of the departure prevention control;

upon determination that the departure condition is satisfied:

executing departure prevention control of the vehicle to prevent the vehicle departing from the lane, when the predetermined departure condition is satisfied;

determining whether the driver has performed an interruption operation to interrupt the departure prevention control during execution of the departure prevention control; and upon determination that the driver has performed the interruption operation, modifying the departure condition so as to tighten the departure condition and increase the amount of control of the vehicle upon execution of the departure prevention control.

* * * * *